US010172226B2

United States Patent
Nebel et al.

(10) Patent No.: US 10,172,226 B2
(45) Date of Patent: Jan. 1, 2019

(54) DC-AC ELECTRICAL TRANSFORMER

(71) Applicant: Tibbar Plasma Technologies, Inc., Los Alamos, NM (US)

(72) Inventors: Richard Nebel, Los Alamos, NM (US); Cihan Akcay, Los Alamos, NM (US); Daniel Barnes, Lamy, NM (US); Juan Fernandez, Los Alamos, NM (US); John Finn, Los Alamos, NM (US); William Gibson, Los Alamos, NM (US); Aaron McEvoy, Los Alamos, NM (US); Keith Moser, Libertyville, IL (US); Liviu Popa-Simil, Los Alamos, NM (US)

(*) Notice: Subject to any disclaimer, the term of this patent is extended or adjusted under 35 U.S.C. 154(b) by 294 days.

(21) Appl. No.: 15/338,197

(22) Filed: Oct. 28, 2016

(65) Prior Publication Data

US 2018/0124908 A1    May 3, 2018

(51) Int. Cl.
  G05F 3/06    (2006.01)
  H05H 1/16    (2006.01)
  H02M 7/42    (2006.01)

(52) U.S. Cl.
  CPC .............. *H05H 1/16* (2013.01); *H02M 7/42* (2013.01)

(58) Field of Classification Search
  CPC ........ H02M 7/02; H02M 7/40; H01J 37/3266; H01J 37/32697; H02K 44/06; H05H 1/16
  USPC .......................................................... 307/51
  See application file for complete search history.

(56) References Cited

U.S. PATENT DOCUMENTS

| | | | |
|---|---|---|---|
| 3,530,334 A | 9/1970 | Thorpe et al. | |
| 4,041,353 A | 8/1977 | Penfold et al. | |
| 4,347,419 A | 8/1982 | Jasper, Jr. | |
| 5,476,501 A | 12/1995 | Stewart et al. | |
| 5,680,014 A | 10/1997 | Miyamoto et al. | |
| 5,917,286 A | 6/1999 | Scholl et al. | |
| 6,095,084 A | 8/2000 | Shamouilian et al. | |

(Continued)

FOREIGN PATENT DOCUMENTS

| | | |
|---|---|---|
| WO | 2006025626 A1 | 3/2006 |
| WO | 2008140928 A1 | 11/2008 |
| WO | 2014084963 A1 | 6/2014 |

OTHER PUBLICATIONS

Aydemir, A.Y. et al., "Compressibility as a feature of field reversal maintenance in the reversed-field pinch," Physics of Fluids, Mar. 1985, pp. 898-902, vol. 28, No. 3, AIP Publishing, USA.

(Continued)

*Primary Examiner* — Carlos D Amaya

(57) ABSTRACT

An apparatus and corresponding systems and methods for managing electric power, particularly a transformer system and method, and more specifically a transformer for transforming direct current to alternating current. An example apparatus includes a chamber configured to contain plasma. The apparatus includes input electrodes disposed at least partially within the chamber, and configured to receive direct current input into the chamber. The input electrodes are configured to cause the input direct current to induce motion in the plasma. Motion induced in the plasma transforms current flowing there-through. Output electrodes extend from the chamber, which output electrodes may rotated in a controlled manner. The output electrodes conduct a three or one phase alternating current, from the induced motion in the plasma, for delivery from the chamber.

22 Claims, 11 Drawing Sheets

(56) References Cited

U.S. PATENT DOCUMENTS

| | | |
|---|---|---|
| 6,215,678 B1 | 4/2001 | Titus et al. |
| 6,396,213 B1 | 5/2002 | Koloc |
| 6,614,135 B1 | 9/2003 | Clapham |
| 6,781,087 B1 | 8/2004 | Chism, Jr. et al. |
| 7,232,985 B2 | 6/2007 | Monkhorst et al. |
| 7,411,353 B1 | 8/2008 | Rutberg et al. |
| 7,482,607 B2 | 1/2009 | Lerner et al. |
| 7,511,246 B2 | 3/2009 | Morrisoe |
| 7,741,577 B2 | 6/2010 | Kong et al. |
| 7,808,353 B1 | 10/2010 | Eskridge et al. |
| 8,031,824 B2 | 10/2011 | Bystriskii et al. |
| 8,289,512 B2 | 10/2012 | Morrisroe |
| 8,537,958 B2 | 9/2013 | Laberge et al. |
| 8,622,735 B2 | 1/2014 | Morrisroe |
| 8,878,434 B2 | 11/2014 | Gilbert |
| 9,028,656 B2 | 5/2015 | Koo et al. |
| 2004/0144314 A1 | 7/2004 | David et al. |
| 2010/0068887 A1 | 3/2010 | Harrington |
| 2010/0202580 A1 | 8/2010 | Park et al. |
| 2011/0272386 A1 | 11/2011 | Morrisroe |
| 2011/0273260 A1 | 11/2011 | Morrisroe |
| 2011/0315867 A1 | 12/2011 | Lane |
| 2015/0294842 A1 | 10/2015 | Nebel |
| 2017/0027048 A1 | 1/2017 | Nebel et al. |

OTHER PUBLICATIONS

Schnack, D. C. et al., "Numerical simulation of reversed-field pinch dynamics," Computer Physics Comm., 1986, pp. 17-28, vol. 43, Amsterdam.

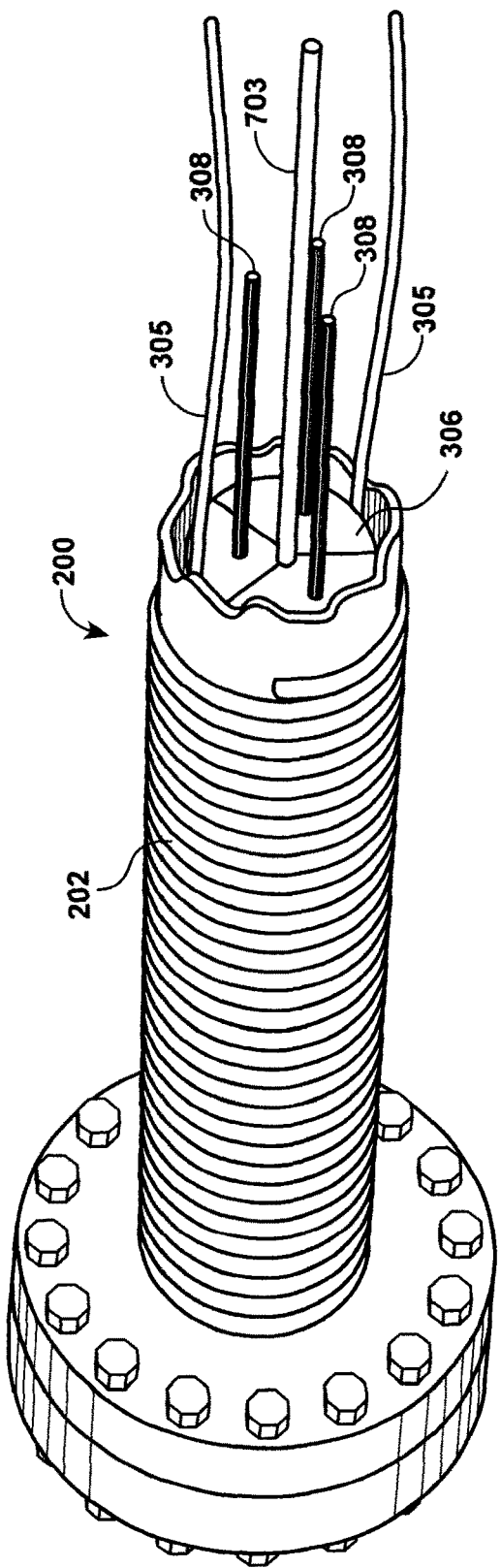

DC-AC ELECTRICAL TRANSFORMER

STATEMENT REGARDING FEDERALLY SPONSORED RESEARCH OR DEVELOPMENT

This invention was made with Government support under Award No. DE-AR0000677, awarded by the Advanced Research Projects Agency-Energy (ARPA-E), U.S. Department of Energy. The Government has certain rights in this invention.

CROSS-REFERENCE TO RELATED APPLICATIONS

This application is related to U.S. patent application Ser. No. 15/209,907, filed 14 Jul. 2016, the entire disclosure of which is hereby incorporated by reference.

BACKGROUND OF THE INVENTION

Alternating current (AC) is typically preferred over direct current (DC) for transmission of electricity over long distances due, at least in part, to the ease of switching (i.e., stepping) voltages and currents with AC power using transformers. Such AC transformers enable long distance transmission. Transmission of DC over the same distances is not easy to do with DC power. Although current solutions provide long distance DC transmission, such solutions are complex and costly. These and other shortcomings are addressed by the present disclosure.

SUMMARY OF THE INVENTIVE DISCLOSURE

It is to be understood that both the following summary and the following detailed description are exemplary and explanatory only and are not restrictive. Provided are methods and systems for, in one aspect, managing DC and AC power. Provided are methods and systems for, in another aspect, transforming DC and AC power.

In an aspect, systems and methods of the present disclosure transform DC and AC voltages and currents, while minimizing cost and complexity. In another aspect, instead of using wires and iron cores similar to known AC transformers, the DC-AC transformer systems of the present disclosure can comprise plasma, helical electrodes, and an axial magnetic field. As an example, the transformation of the DC and AC voltages and currents can be based on magnetohydrodynamics (MHD) dynamo behavior.

In another aspect, an example system can comprise plasma disposed in a housing and two or more helical electrodes disposed in the housing, wherein an electric current passing through the two or more helical electrodes induces a rotation in the plasma. Conductive end caps can be coupled to the housing and the helical electrodes.

In yet another aspect, a method can comprise generating a magnetic field through plasma and generating a rotation in the plasma, thereby generating an electric current.

In another aspect, an example apparatus can comprise a chamber configured to contain plasma. The apparatus can comprise at least two input electrodes disposed at least partially within the chamber and configured to receive a direct current into the chamber. The at least two input electrodes can be configured to direct the direct current to induce motion in the plasma. The apparatus can comprise at least two output electrodes extending from the chamber. The at least two output electrodes can be configured to conduct a single phase alternating current from the chamber based on the induced motion in the plasma. If three or more output electrodes are used, three phase alternating current can be conducted from the chamber.

In another aspect, an example method can comprise conveying a direct current into a chamber, inducing motion in a plasma contained in the chamber based on the direct current, and receiving from the chamber either a single phase alternating current or a three phase alternating current based on the induced motion of the plasma.

In another aspect, an example system can comprise a transformer configured to transform a direct current to either a single phase alternating current or a three phase alternating current. The transformer can comprise a chamber configured to contain plasma and at least two (e.g., two or more) input electrodes disposed at least partially within the chamber and configured to direct the direct current to induce motion in the plasma, thereby generating either a single phase alternating current or a three phase alternating current. The transformer can comprise at least two output electrodes extending from the chamber and configured to conduct the single phase alternating current from the chamber, or at least three output electrodes to conduct three phase alternating current from the transformer. The system can comprise an electrical delivery network electrically coupled to the at least two output electrodes and configured to conduct the single phase alternating current to at least one remote location, or the system can comprise an electrical delivery network electrically coupled to the at least three output electrodes and configured to conduct the three phase alternating current to at least one remote location.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2 is a perspective view of an exemplary transformer system according to the present invention;

Figure 1A:
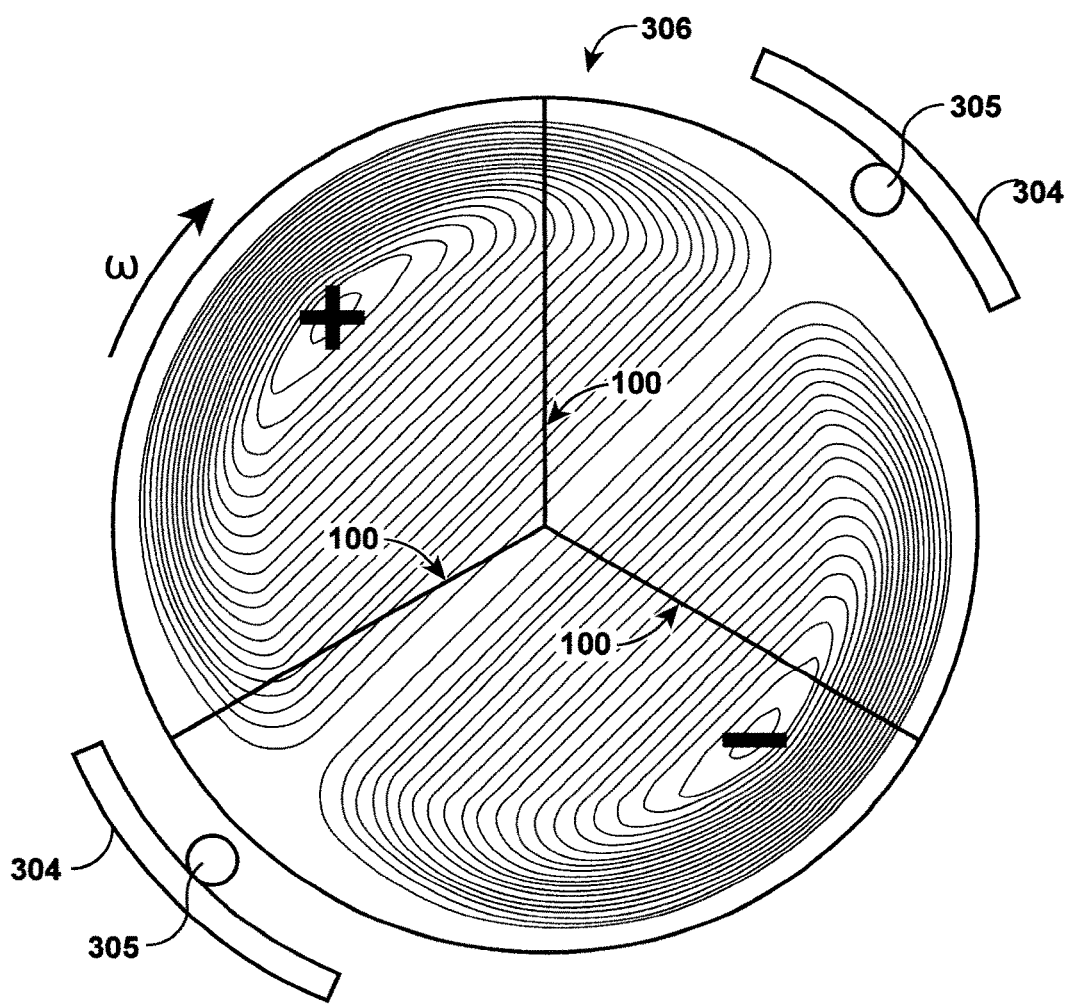
FIG. 1A is a diagrammatic sectional view of axial current density superposed on a split electrode configured to produce 3 phase AC power, in a system according to the present invention.

The various views are not necessarily to scale, either within a particular view or between views.

DETAILED DESCRIPTION OF EMBODIMENTS

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Herein disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this disclosure including, but not limited to, steps in disclosed methods. Thus, if there are a variety of additional steps that can be performed, it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following descriptions.

As will be appreciated by one skilled in the art, the methods and systems disclosed herein, and sub-methods and subsystems, may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software routines and algorithms. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It is understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

The computer program instructions according to this disclosure may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus, to produce a computer-implemented process such that the instructions that are executed on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and methods, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The systems and methods of the present disclosure generally involve inducing a flow in plasma, and exploiting the plasma flow to realize a current transformation or conversion. Flows can be induced in plasmas by applying an electric field perpendicular to the magnetic field. The ideal MHD Ohm's law can be written as:

$$E + V \times B = 0, \quad (1)$$

where E is the local electric field, V is the local plasma velocity, and B is the local magnetic field. Bold face indicates quantities which are vectors.

If equation (1) is crossed with the magnetic field B, it can be determined that the plasma flow perpendicular to the magnetic field (denoted as $V_{E \times B}$ and commonly referred to as the E×B drift velocity) becomes:

$$V_{E \times B} = (E \times B)/B^2, \quad (2)$$

where $B^2$ is the vector dot product of B with itself.

In order for the E×B drift velocity to significantly change the magnetic field it must be comparable to the Alfven speed ($V_A$) which can be expressed as:

$$V_A = B/(\mu_0 \rho)^{1/2}, \quad (3)$$

where B is the magnitude of the magnetic field, ρ is the mass per unit volume, and μ0 is the permittivity of free space. Equation (1) can be combined with Maxwell's field evolution equation:

$$\partial B/\partial t = -\mathrm{curl}(E) \quad (4)$$

and integrated over a surface. As such, the result calculation provides that the magnetic field lines (or the magnetic flux) are substantially frozen into the plasma. As an example, the magnetic field lines convect with the plasma.

When plasma velocities approach the Alfven speed ($V_A$) the plasma velocities can bend the magnetic field lines. Thus, if a velocity shear is induced in the perpendicular velocity (e.g., the $V_{E\times B}$ drift velocity) along a magnetic field line, the magnetic field can be significantly modified (provided that the flow speeds are near the Alfven speed ($V_A$).

Three-dimensional nonlinear plasma simulations (resistive magnetohydrodynamics (MHD)) can be used to confirm aspects of the phenomenon described herein above. As an example, simulation code similar to that implemented in A. Y. Aydemir, D. C. Barnes, E. J. Caramana, A. A. Mirin, R. A. Nebel, D. D. Schnack, A. G. Sgro, *Phys Fluids* 28, 898 (1985) and D. D. Schnack, D. C. Barnes, Z. Mikic, D. S. Harned, E. J. Caramana, R. A. Nebel, *Computer Phys Comm* 43, 17 (1986), can be used. As a further example, plasma can be simulated in cylindrical geometry.

In an aspect, an axial magnetic field can be applied along a helical electric field (e.g., provided via a pair of helical electrodes on the boundary). Such simulation can be plotted as current contours, as shown in FIG. 1A.

The $J_z$ value that is plotted is defined as:

$$\mu_0 J_z = [\mathrm{curl}(B)]_z, \quad (5)$$

where $J_z$ is the axial current density.

As illustrated in FIG. 1A, the $J_z$ contours produced by the MEM simulations can be superposed on a split electrode, labeled as 306. The electrode according to the disclosed apparatus and method can be split into three pieces, separated by insulators labeled as 100. The shown setup is used to convert DC to three-phase AC. If the electrode 306 instead is divided into only two segments, the system produces single phase AC; if the electrode is divided into three insulated segments, as illustrated, the system produces three phase AC. A two-segment electrode is devised similarly to the three-segmented version seen in the drawing figures, except that the electrode is split into two generally equal halves insulated from each other. It is understood that either embodiment can be devised and constructed according to this disclosure, depending upon which phase AC power is desired. Particulars of the system configuration can be adapted, according to this disclosure, to fabricate an apparatus for transforming DC current into either three- or one-phase AC current to meet the intended power sought to be produced. The helical electrodes are labeled as 304. The connector leads are labeled as 305. If the endcap is rotated at ω=3600 Revolutions Per Minute (RPM), the presently disclosed device will produce 60 Hz AC. If the endcap is rotated at ω=3000 RPM, 50 Hz AC will be produced. The plasma produces two axial currents that travel in opposite directions, labeled + and − in FIG. 1A.

Figure 1B:
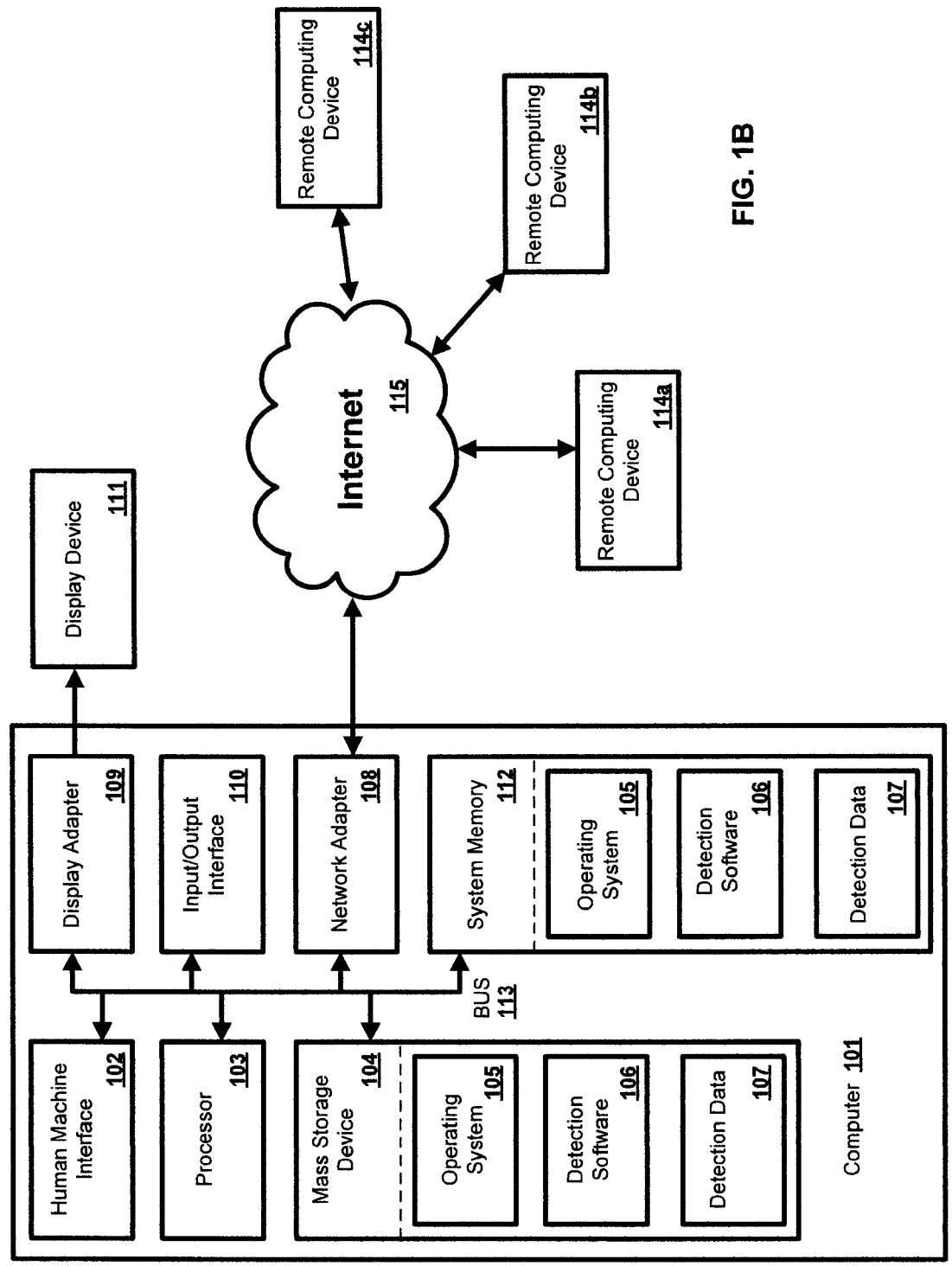
FIG. 1B is a block diagram of an exemplary computing device in accordance with the present invention.

FIG. 1B is a block diagram illustrating an exemplary operating environment for performing the disclosed methods. This exemplary operating environment is only an example of an operating environment, and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, dynamos, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

With attention invited to FIG. 1B, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description, can also be implemented over a wired or wireless network connection and each of the subsystems, including the processor 103, a mass storage device 104, an operating system 105, simulation software 106, simulation data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as simulation data 107 and/or program modules such as operating system 105 and simulation software 106 that are immediately accessible to and/or are presently operated on by the processing unit 103.

The computer 101 may also comprise other removable/non-removable, volatile/non-volatile computer storage media. By way of example, FIG. 1B illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and simulation software 106. Each of the operating system 105 and simulation software 106 (or some combination thereof) can comprise elements of the programming and the simulation software 106. Simulation data 107 can also be stored on the mass storage device 104. Simulation data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

A user can enter commands and information into the computer 101 via an input device (not shown). Examples of known such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

A display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of simulation software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 2 illustrates a cylindrical vacuum chamber 200 of a transformer system according to the present disclosure. Plasma (not shown) can be disposed in the chamber 200. As an example, a conductor 202 (e.g., wire) can be disposed around a periphery of the housing forming the chamber 200. As a further example, wire conductor 202 can be wound about the chamber 200 to define a solenoid that provides an axial magnetic field when current flows through the conductor. FIG. 2 also shows, by way of example, a tripartite electrode 306. In communication with the electrode 306 are respective secondary leads 308. The electrode 306 optionally is rotatable by means of a rotation shaft or stalk 703. Leads 305 are used to apply voltage and current to electrodes within the chamber 200.

Figure 3A:
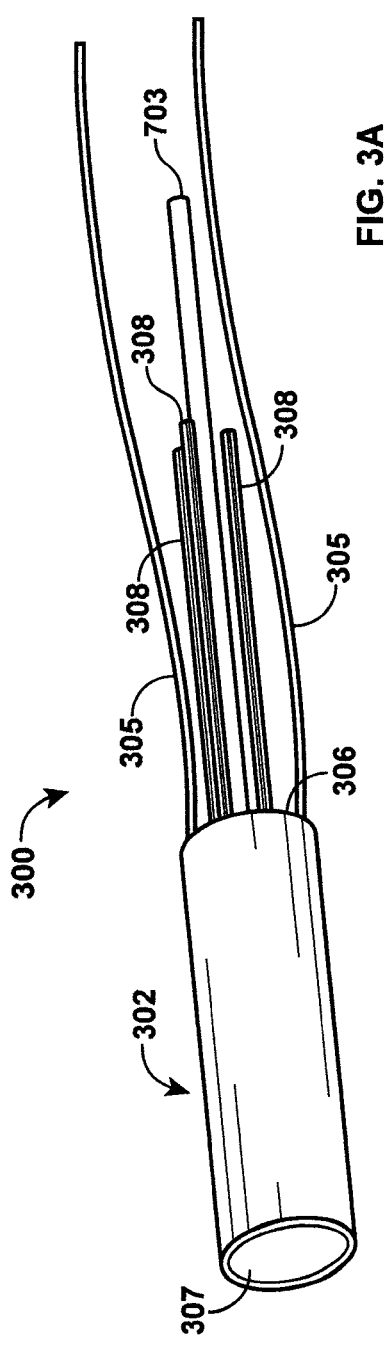
FIG. 3A is a perspective view of an exemplary transformer assembly.
Figure 3B:
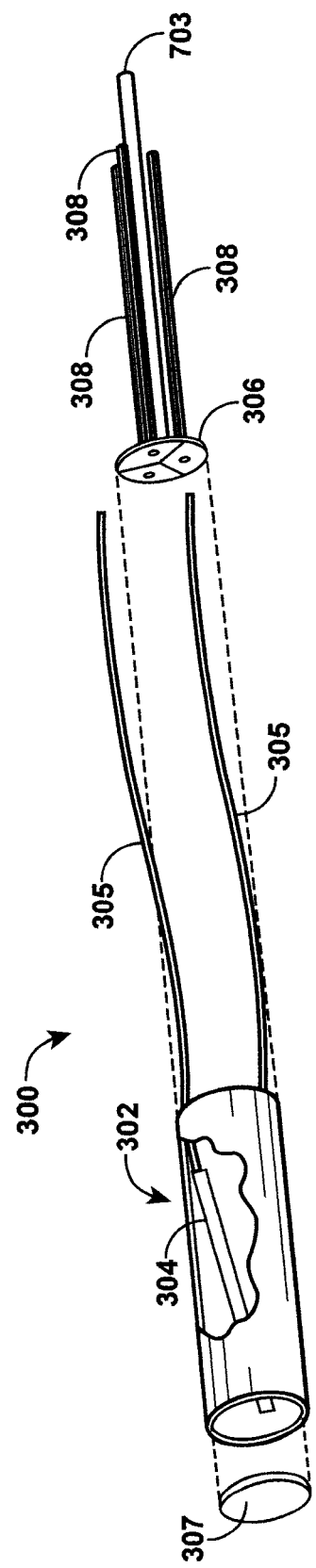
FIG. 3B is an exploded perspective view of an exemplary transformer assembly.

FIG. 3A and FIG. 3B illustrate a transformer assembly 300 in accordance with the present system and method. The transformer assembly comprises a housing 302 having two or more electrodes 304 disposed therein and/or extending there from. As an example, the electrodes 304 can be disposed in the chamber 200 of FIG. 2, that is, the chamber 300 of FIGS. 3A-B in at least one embodiment is analogous to the chamber 200. As shown, the electrodes 304 (only one shown in FIG. 3B) are helically wound within the chamber and preferably have a 10:1 twist (e.g., the electrodes travel 10 times as far in the axial direction as they do in the poloidal (azimuthal direction)). Other twists can be used and ratios can be used. For example, twists can range from about 1:50 to about 1:1 axial to poloidal ratio. The electrodes 304 serve as the primary for the transformer system according to this disclosure. Preferably, and as suggested by FIGS. 1A, 4, and 8, the input electrodes, particularly the helical electrodes 304, are equally spaced around the chamber circumference; i.e., two diametrically opposed input electrodes are separated by 180 degrees. There may be at least two sets of electrodes, and sets (e.g. associated pairs of electrodes) are likewise equally spaced around the chamber. Voltage and current can be applied across the electrodes 304, for example, via leads 305. Accordingly, the applied electric field is perpendicular to the applied magnetic field from conductor 202 shown in FIG. 2.

The electrodes 304 when actuated thus induce rotation in the plasma via the E×B drift. Because the electrodes 304 are helical in configuration and arrangement relative to the chamber 300, this rotation is sheared in the axial direction. The result is that the field lines are bent and an axial current is induced.

The housing 302 can be formed from ceramic or electrical insulators such as plastic or composite materials. Moreover, end caps 306 and 307 preferably are disposed at opposite ends of the housing 302. End cap 306 in FIGS. 3A-B is the split electrode displayed in FIG. 1A. At or near the other end of the housing 302 is a solid electrode 307. In an aspect, the end cap 307 forms the secondary of the transformer. The end caps 306 and 307 preferably are conductive, and are capable of capturing the voltage and current that is generated parallel to the magnetic field. The end cap electrode 306 is physically rotatable by the action of 703, the rotation stalk.

Figure 4:
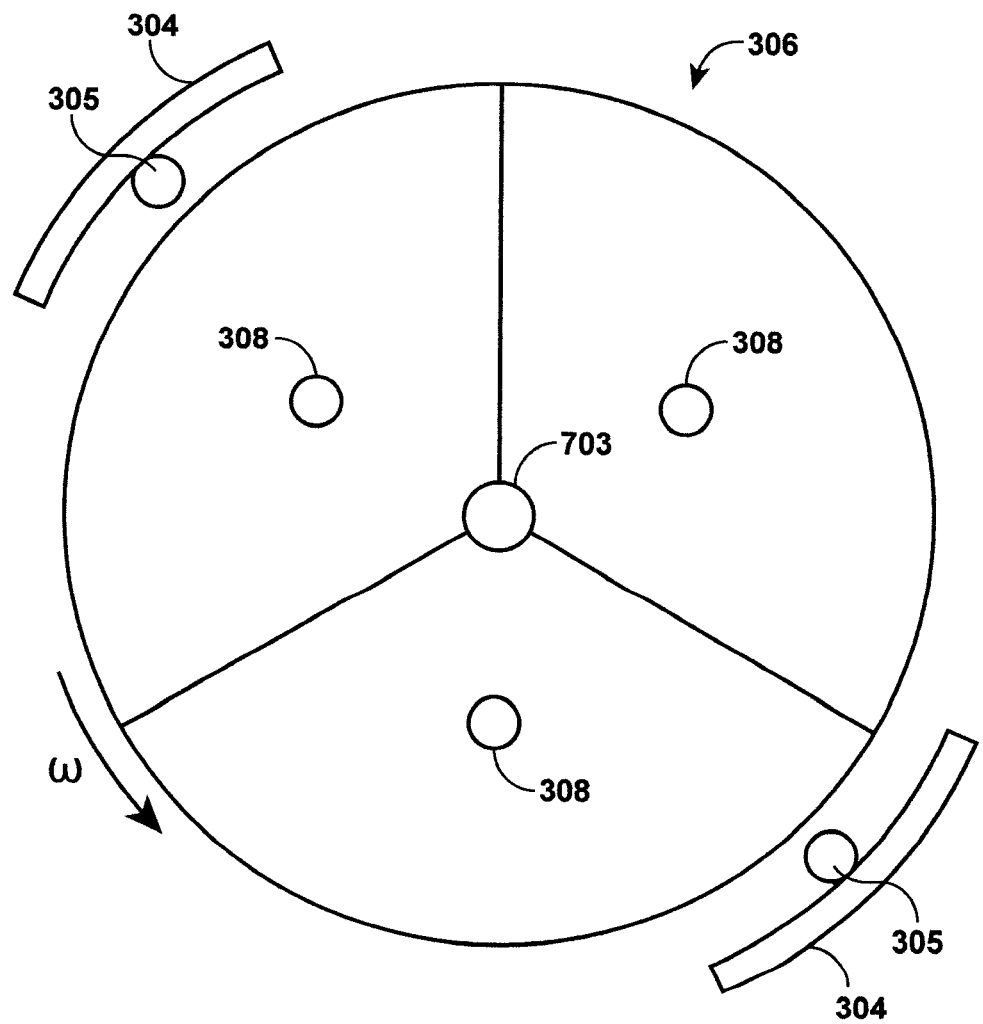
FIG. 4 is an axial view of a split electrode according to the present invention, configured to produce 3 phase AC power.

Reference is made to FIG. 4, which illustrates the outside of the electrode shown in FIG. 1A and FIGS. 3A-3B. The split electrode is labeled as 306, and the leads for the secondary are labeled as 308. The primary electrodes 304 (also seen in FIG. 1A and FIG. 3B) and their corresponding leads 305 are also shown, as well as the rotation direction ω. Component 703 is the rotation stalk, by which the split electrode 306 may be rotated.

Figure 5:
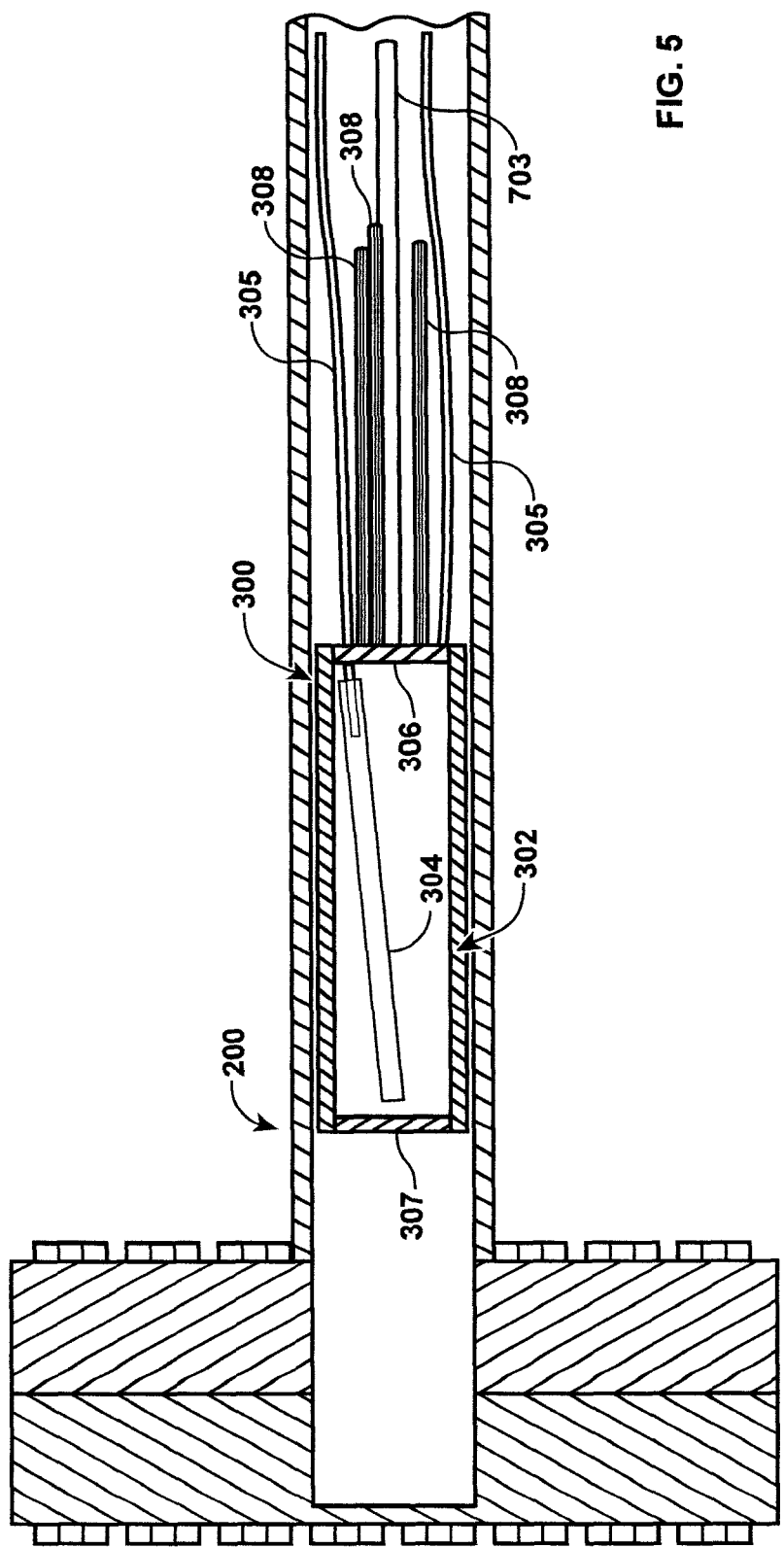
FIG. 5 is a cross-section view of an exemplary transformer system.

As shown in FIG. 5, the transformer assembly 300 of FIGS. 3A-3B may in a preferred embodiment be disposed in the vacuum chamber 200 of FIG. 2. In another aspect, the helical electrodes 304, which are within and/or extending from the housing 302, are powered by an electric current, e.g., DC. Two or more conductors carry the current from the end cap 306, and constitute the secondary of the transformer assembly. Two or more terminals 308 can be coupled to the end cap 306 to allow the secondary current to be transmitted to a remote location for use. Again, 703 in FIG. 5 is the rotation stalk.

There thus is provided according to the foregoing a DC to AC transformer apparatus including: (1) a chamber 200, 300 configured to contain plasma; (2) at least two input electrodes 304 disposed at least partially within the chamber and configured to receive a direct current into the chamber, wherein the at least two input electrodes 304 are configured to direct or convey the direct current from outside the chamber to induce motion in the plasma; and (3) at least two output electrodes 306 extending from the chamber, wherein the at least two output electrodes are configured to conduct an alternating single phase or three phase current from the chamber based on the induced motion in the plasma. The chamber 200, 300 preferably has an end cap 307 and a split electrode 306 disposed at opposite ends of the chamber; all output leads 308 of the at least two output electrodes 306 (e.g., electrode 306 typically is split into either two or three segments) are disposed through the split electrode 306.

The system features a solenoid 202, 744 disposed around at least a portion of an external wall of the chamber 200, so that an electric current passing through the solenoid induces a magnetic field within the chamber in an axial direction of the solenoid. This magnetic field is caused by the induced motion in the plasma to align at least in part with magnetic fields caused by at least a portion of the at least two input electrodes 304, thereby inducing a direct current within the chamber.

In various embodiments of the system and apparatus, the least two input electrodes 304 are disposed at least partially within the chamber 200 or 300, and are configured to convey or direct the direct current from outside the chamber to induce the motion in the plasma, which thereby generates the alternating three phase or single phase current; the at least two output electrodes 306 extend from the chamber, and are configured to conduct the produced alternating three phase or single phase current from the chamber. Whether the apparatus ultimately produces one- or three-phase AC depends upon whether the output electrode 306 is split into two or three segments. The chamber 200 or 300 preferably has the end cap 307 and the split electrode 306 at opposite ends of the chamber, and, as mentioned, the split electrode conveys either three phase AC or single phase AC from the chamber.

There preferably is an electrical delivery network, such as including suitable leads or wires 308, cables, switching, etc., known in the art, electrically coupled to the at least two output electrodes 306, which are configured to conduct the produced alternating three phase or single phase current to a remote location. Also, each of the at least two input electrodes 304 comprises at least one helically shaped portion of the electrode, as indicated in FIG. 3B.

Figure 6:
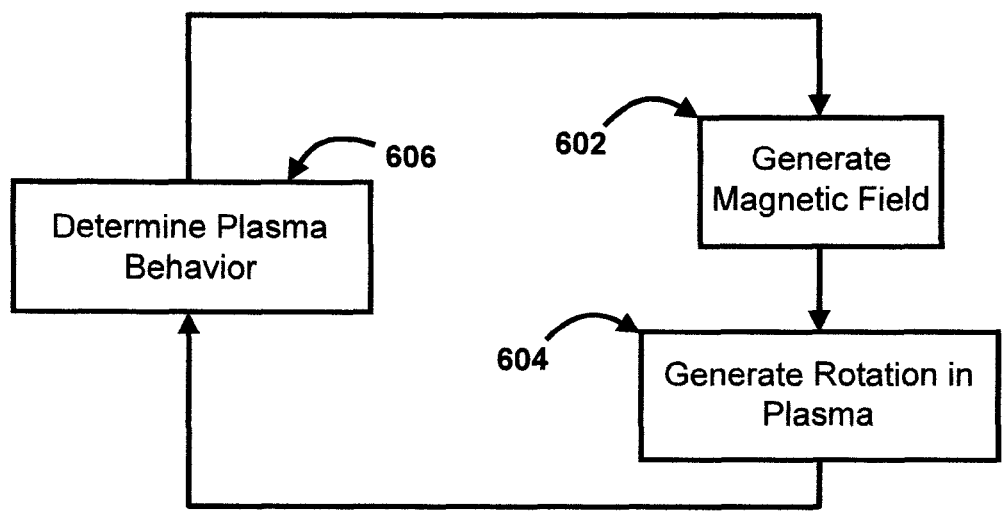
FIG. 6 is a flow diagram of an exemplary method.

The flowchart of FIG. 6 illustrates that a method according to this disclosure can comprise generating a magnetic field through a plasma (step 602) and thus generating a rotation in the plasma (step 604), thereby generating an electric current. The magnetic field can be generated by a solenoid assembly. As an example, the solenoid assembly can be disposed around the plasma, such as a solenoid housing. In an aspect, the rotation can be sheared in an axial direction relative to the plasma, and the current is generated in the axial direction. A drift speed of the plasma is a factor (e.g., fraction or multiple) of the Alfven Speed, as explained previously. For example, the drift speed of the plasma can be between about 0.01 and about 400 times the Alfven speed. As a further example, the drift speed can be between about 0.01 and about two times the Alfven speed, most preferably about one times the Alfven Speed e.g., the drift speed approximates the Alfven Speed. Alternatively, the drift speed of the plasma may between about 0.01 and about 10 times the Alfven speed, between about 0.01 and about 100 times the Alfven speed, between about 0.01 and about 200 times, or between about 0.01 and about 300 times the Alfven speed. For many practical applications, the most likely value of the drift speeds is approximately one times the Alfven speed, e.g., they speeds are about equal. Other ranges of factors can result from the systems and methods of the present disclosure. In another aspect, generating a rotation in the plasma comprises generating one or more of a partial laminar flow and a turbulent flow in the plasma. In a further aspect, plasma behavior can be determined (e.g., estimated, simulated) using an MHD simulation (step 606). Accordingly, the magnetic field and rotation generated can be configured based on the MHD simulation.

Figure 7:
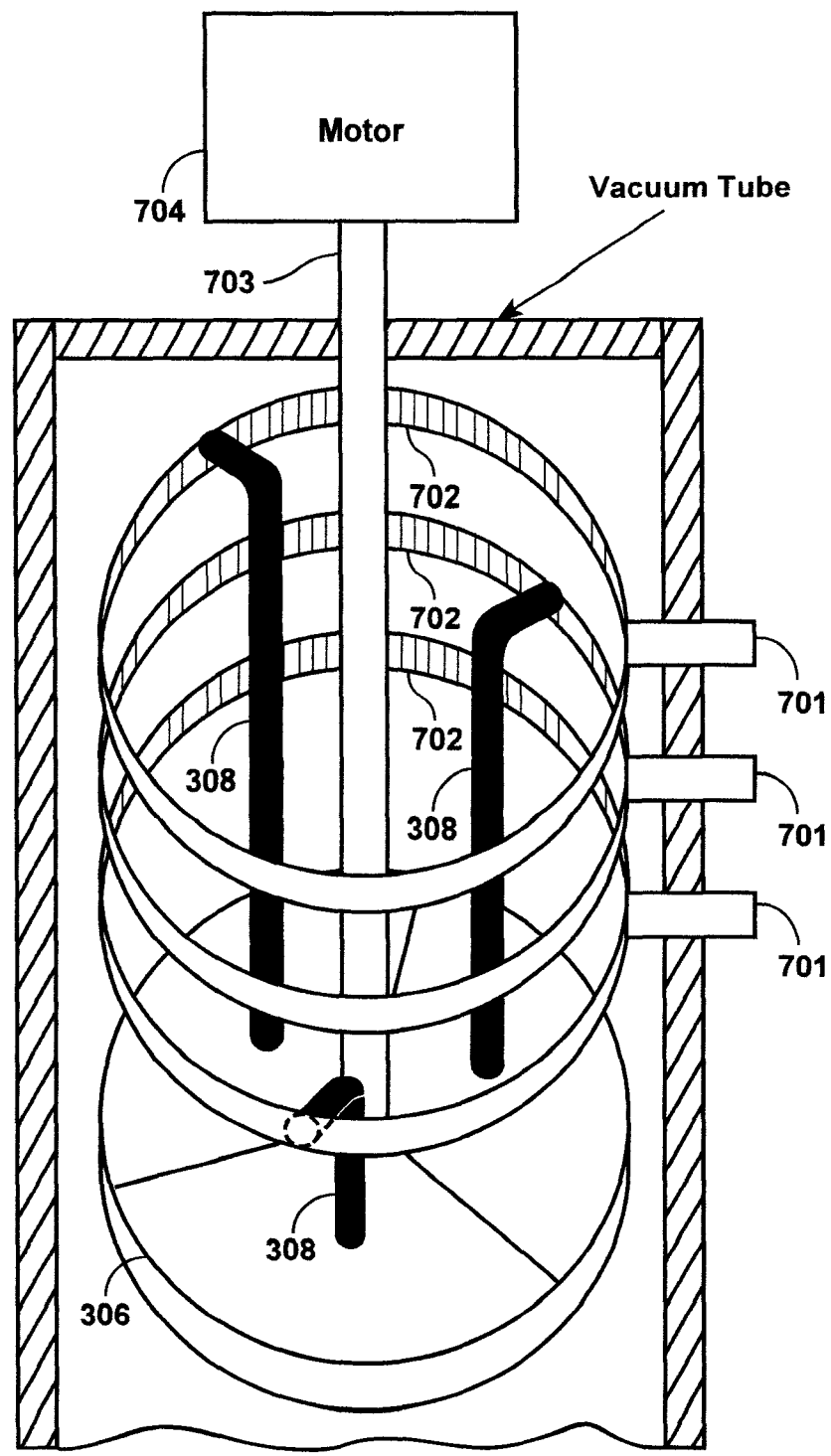
FIG. 7 is a diagrammatic, partially sectional, view of an exemplary rotating split electrode system to produce three phase alternating current power.

FIG. 7 depicts an end assembly of the chamber 200. A motor 704 rotates the split electrode 306 at a controllable speed. The secondary leads 308 in this embodiment are rods which individually rub against the stationary conducting rings 702. As indicated in FIG. 7, each rod lead 308 is associated with a single segment of the split electrode, and each lead 308 also makes electrically conductive rubbing contact with a single corresponding ring 702. Current in a particular ring 702 is output via its respective terminal 701. The three phase AC, or the single phase AC, leaves the chamber through the respective conducting rings terminals 701. The rotating stalk 703 also exits the chamber before it connects to the motor 704.

Figure 8:
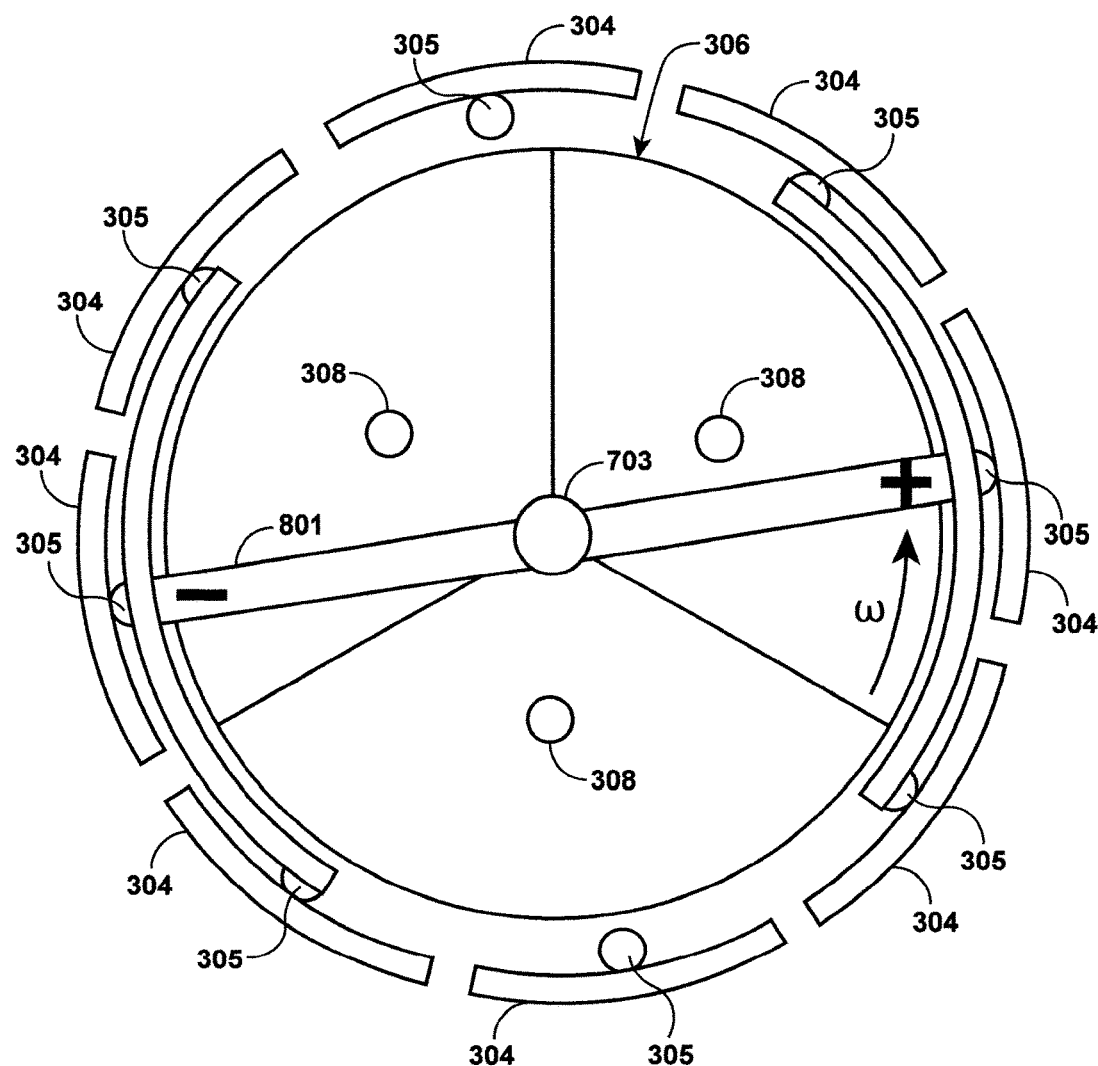
FIG. 8 is an axial view of an alternative embodiment of an exemplary system according to the present invention, showing a stationary split electrode using a rotor with multiple helical primary electrodes to produce three phase alternating current power.

FIG. 8 shows a second, alternative, way to produce either three phase AC, or single phase AC, according to the precepts of the present disclosure. In this embodiment, the split electrode 306 is fixed in position, and is seen to have three insulated segments. Multiple pairs of electrodes 304 are used in functional cooperation with a rotatable external rotor 801. The conductive rotor 801, can be driven, e.g., by a motor (not shown) in operable connection with the shaft or stalk 703, to rotate about an axis; in the illustrated embodiment, the axis of rotation is coaxial with the axis of the split electrode 306. It is observed with reference to FIG. 8 that in the embodiment, two diametrically opposed groups of three adjacent electrodes 304 are electrically connected by an arcuate shaped contact that electrically connects three corresponding electrode leads 305. The rotor 801 has oppositely charged ends, indicated by the + and − labels in FIG. 8, and thus alternately delivers either positive or negative current to the grouped leads 305 as the rotor rotates. The rotation speed of the external rotor 801 is controllable; the rotor normally rotates at a selected speed of either 3600 RPM or 3000 RPM. Multiple pairs of primary electrodes 304 thus are electrically connected via the rotating external rotor 801 to convert the axial currents in the chamber to three phase alternating current or single phase alternating current. This embodiment otherwise may be compared form and function to the embodiment of FIG. 4.

Figure 9:
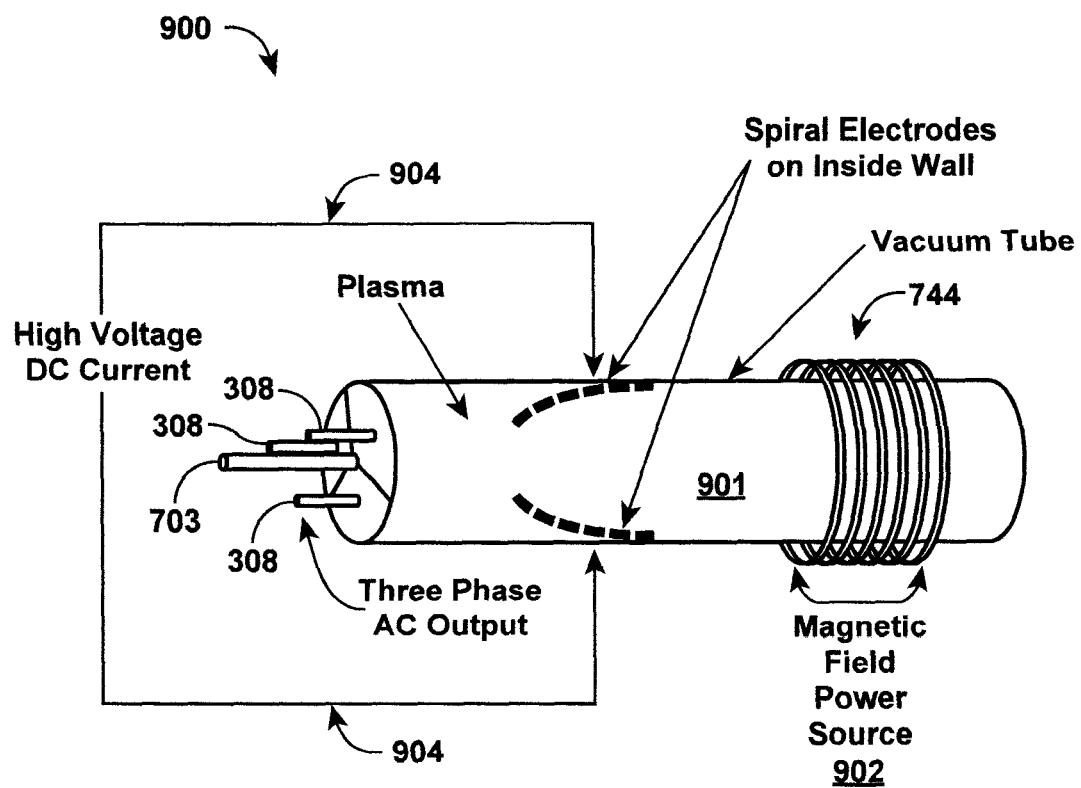
FIG. 9 is a circuit diagram illustrating an exemplary system for transforming electrical current.

FIG. 9 is a circuit diagram illustrating an example system, in accordance with the presently disclosed system and method, for transforming electrical current. In an aspect, the system 900 can comprise the apparatus 901 (e.g., DC-AC transformer) described herein above. For example, the apparatus 901 can comprise a transformer configured to transform a direct current to an alternating current. The system 900 can comprise a magnetic field power source 902. The magnetic field source can comprise a current source, voltage source, and/or the like configured to provide current and/or voltage to the solenoid 744 (e.g., thereby generating a magnetic field along the axis of the solenoid 744). The current and/or voltage are selectable to cause a target current and/or target voltage to be induced from the apparatus 901. The system 900 preferably includes input lines 904. Input lines 904 are electrically conductive paths. The input lines 904 can be configured to carry a direct current to the apparatus 901. For example, the input lines 904 can be electrically coupled to the at least two input electrodes 304 (not seen in FIG. 9; shown in FIGS. 1A, 3B, and 4) of the apparatus 901. In one embodiment, the input electrodes are helically shaped. Typically, there are at least two input electrodes, and they preferably are equally spaced, in relation to each other, around the chamber circumference. For example, four such input electrodes are uniformly spaced by about ninety degrees. The system 900 preferably also comprises output lines 308. The output lines 308 are electrically conductive paths. The output lines 308 can be configured to carry an alternating current from the apparatus 901. For example, the output lines 308 can be electrically coupled to the at least two output electrodes terminals 701, as shown in FIG. 7. In an aspect, the output lines 308 can be electrically coupled to an electrical delivery network configured to conduct the three phase AC or single phase AC current to at least one remote location (e.g. a remote component of a device, a remote device in a system, a remote power station).

The system 900 can be integrated into and/or implemented in a variety of devices, systems, and/or applications, such as commercial buildings, homes, factories and the like.

Figure 10:
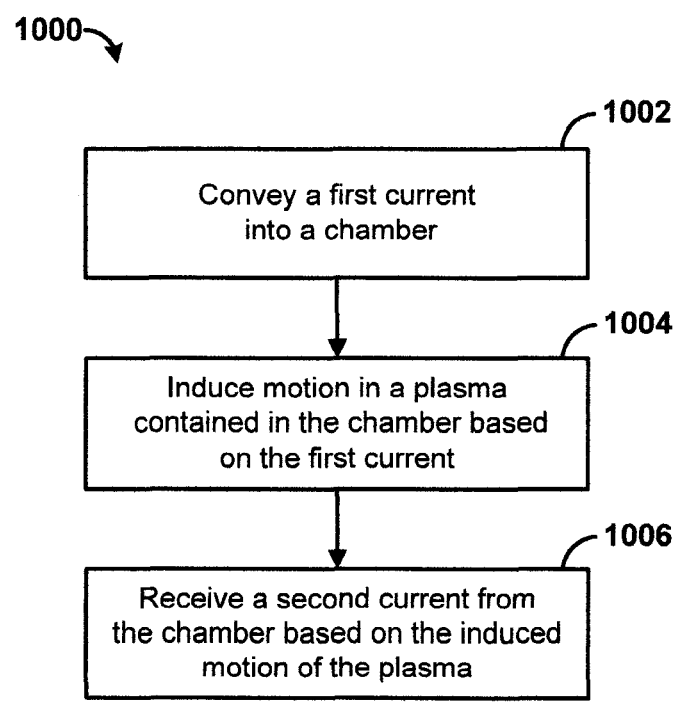
FIG. 10 is a flow chart illustrating an exemplary method for transforming an electrical current.

Attention is advanced to FIG. 10, providing a flow chart illustrating an example method 1000 for transforming and/or converting a voltage and/or an electrical current. At step 1002, a first current can be conveyed (e.g., provided, carried, transported, channeled) into a chamber. The first current can comprise a direct current. The first current can comprise a first voltage. For example, the first current can be conveyed to the chamber from a component of a power plant, power station, power line, and/or the like. The first current can be conveyed into the chamber via two or more electrodes (e.g., two, four, six, eight). The two or more electrodes can be disposed at least partially within the chamber. For example, the two or more electrodes can each comprise a first portion extending outside of the chamber and a second portion within the chamber.

The chamber may contain a hot gas, plasma, and/or the like. For example, the chamber can be filled with a gas, such as argon or hydrogen. Preferably, the gas is converted to plasma before, or at the time of, the first current is conveyed to the chamber, although in some alternative embodiments the plasma is created after the initial application of the first current. The plasma (and/or hot gas) can be filled to a specified pressure (e.g., 1 mtorr) to achieve a desired behavior (e.g., motion) of the plasma and/or gas. The chamber can be configured (e.g., shaped) to cause, direct, constrain, control, and/or the like motion of the plasma within the chamber. For example, the chamber can be cylindrically shaped.

According to the system and method, a magnetic field can be generated through the plasma. For example, a wire proximate the chamber can generate a magnetic field. The wire, which may define a solenoid, can be disposed (e.g., wrapped) around an exterior wall of the chamber. In an aspect, a protective layer (e.g., cover, shroud) can be disposed in between the wire and the chamber.

At step 1004 of FIG. 10, motion can be induced in a plasma contained within the chamber based on the first current. For example, the first current can generate a second magnetic field within the chamber. The second magnetic field can be based on the path of the first current. For example, the two or more electrodes can be disposed, shaped, or the like, to generate an electric field between at least two of the one or more electrodes. In an aspect, the electric field can be a helically symmetric electric field. For example, the electric field can be rotated along the axis of the chamber. The electric field can cause, at least in part, the second current and/or the second voltage to be generated within the chamber.

Inducing the motion in the plasma can distort the magnetic field thereby inducing a second current within the chamber. Inducing motion in the plasma can comprise providing the first current through at least one helical electrode within the chamber. The induced motion can comprise rotation sheared in an axial direction relative to the plasma. Induced motion can comprise a differential rotation in the plasma. The induced motion may comprise a turbulent flow, a laminar flow, or a combination thereof. For example, the motion can be along a first direction at the center of the chamber. The motion can be along a second direction along interior walls of the chamber. The second direction can be opposite the first direction. The first direction and the second direction can be directions along (e.g., parallel to) the axis of the chamber.

At step 1006, the second current can be received from the chamber based on the induced motion of the plasma. The second current can comprise a three phase alternating current, or a single phase alternating current, and/or the like. As an illustration, the first current can comprise a direct current and the second current can comprise an alternating current.

The second current can be generated in an axial direction (e.g., along an axis or length of the chamber). For example, the second current can be generated along a line extending from a top (e.g., top cap) of the chamber to a bottom (e.g., bottom cap) of the chamber.

Furthermore, the first current can be conveyed with a first voltage. The second current can be conveyed with a second voltage. The second voltage can be a high voltage or low voltage in comparison to the first voltage. For example, the second voltage can be X (e.g., 1 2, 3, 4, 5, etc.) orders of magnitude greater or less than the first voltage.

In summary, the method of the invention includes the basic steps of conveying a direct current into the chamber; inducing motion in a plasma contained in the chamber, the motion being based on the conveyed direct current; and then receiving an alternating three phase or single phase current from the chamber based on the induced motion of the plasma. There also is the step of generating a magnetic field through the plasma, wherein the step of inducing the motion in the plasma distorts the magnetic field, thereby inducing the alternating three phase or single phase current within the chamber. The step of inducing motion in the plasma preferably includes the step of providing the direct current through at least two helically-shaped electrodes situated within the chamber. Also, the step of inducing motion in the plasma may also include the step of inducing a rotation in the plasma that is sheared in an axial direction relative to the plasma, and the further step of thus generating the alternating three phase, or single phase, current in the axial direction. Inducing motion may include the step of generating a turbulent flow, a laminar flow, or a combination of turbulent and laminar flows, in the plasma. Inducing motion also may include the step of inducing a differential rotation in the plasma.

The step of conveying the direct current preferably comprises the step of conveying with a first voltage DC; the method also includes the resulting step of conveying, with and by a second voltage, the alternating three phase or single phase current from the chamber.

One version of the method includes rotating a split electrode to convert axially directed current in the chamber to three phase alternating current or single phase alternating current. Multiple pairs of primary electrodes preferably are electrically connected via a rotating external rotor to convert axial currents in the chamber to the three phase alternating current or the single phase alternating current.

The foregoing examples are offered so as to provide those of ordinary skill in the art with a further disclosure and description of how the compounds, compositions, articles, devices and/or methods claimed herein are made and evaluated, and are intended to be purely exemplary and are not intended to limit the scope of the methods and systems.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This is true for any possible non-express basis for interpretation, including: matters of logic with respect to arrangement of steps or operational flow; plain meaning derived from grammatical organization or punctuation; the number or type of embodiments described in the specification.

Various publications are referenced hereinabove. The disclosures of these publications in their entireties are hereby incorporated by reference into this application in order to more characterize the state of the art to which the methods and systems pertain.

It will be apparent to those skilled in the art that various modifications and variations can be made without departing from the scope or spirit of the disclosed invention. Other embodiments will be apparent to those skilled in the art from consideration of the specification and practice disclosed herein. It is intended that the specification and examples be considered as exemplary only, with the scope of the invention being defined by the claims appended hereto.

What is claimed is:

1. An apparatus comprising:
   a chamber configured to contain plasma;
   at least two input electrodes disposed at least partially within the chamber and configured to receive a direct current into the chamber, wherein the at least two input electrodes are configured to direct the direct current to induce motion in the plasma; and
   at least two output electrodes extending from the chamber, wherein the at least two output electrodes are configured to conduct an alternating single phase or three phase current from the chamber based on the induced motion in the plasma.

2. The apparatus of claim 1, wherein the at least two input electrodes are equally spaced around the chamber.

3. The apparatus of claim 1, wherein the chamber comprises an end cap and a split electrode disposed at opposite ends of the chamber, and wherein all output leads of the at least two output electrodes are disposed through the split electrode.

4. The apparatus of claim 1, further comprising a solenoid disposed around at least a portion of an external wall of the chamber, wherein an electric current passing through the solenoid induces a magnetic field within the chamber in an axial direction of the solenoid.

5. The apparatus of claim 4, wherein the magnetic field is caused by the induced motion to align at least in part with magnetic fields caused by at least a portion of the at least two input electrodes thereby inducing the direct current within the chamber.

6. The apparatus of claim 4, further comprising a protective cover disposed between the solenoid and the chamber.

7. The apparatus of claim 1, wherein the at least two input electrodes comprise at least two direct current input electrodes.

8. A method comprising:
conveying a direct current into a chamber;
inducing motion in a plasma contained in the chamber based on the direct current; and
receiving an alternating three phase or single phase current from the chamber based on the induced motion of the plasma.

9. The method of claim 8, further comprising generating a magnetic field through the plasma, and wherein inducing the motion in the plasma distorts the magnetic field thereby inducing the alternating three phase or single phase current within the chamber.

10. The method of claim 8, wherein inducing motion in the plasma comprises providing the direct current through at least two helical electrodes within the chamber.

11. The method of claim 8, wherein inducing motion comprises inducing a rotation sheared in an axial direction relative to the plasma, and further comprising generating the alternating three phase or single phase current in the axial direction.

12. The method of claim 8, wherein conveying a direct current comprises conveying with a first voltage, and further comprising conveying the alternating three phase or single phase current from the chamber with a second voltage.

13. The method of claim 8 further comprising rotating a split electrode to convert the axially directed current in the chamber to three phase alternating current or single phase alternating current.

14. The method of claim 8 where multiple pairs of primary electrodes electrically connected via a rotating external rotor convert axial currents in the chamber to three phase alternating current or single phase alternating current.

15. The method of claim 8, wherein inducing motion comprises generating a turbulent flow, a laminar flow, or a combination of turbulent and laminar flows, in the plasma.

16. The method of claim 8, wherein inducing motion comprises inducing a differential rotation in the plasma.

17. A system comprising a transformer configured to transform a direct current to an alternating three phase or single phase current, the transformer comprising,
a chamber configured to contain plasma;
at least two input electrodes disposed at least partially within the chamber and configured to direct the direct current to induce motion in the plasma, thereby generating the alternating three phase or single phase current;
at least two output electrodes extending from the chamber and configured to conduct the alternating three phase or single phase current from the chamber; and
an electrical delivery network electrically coupled to the at least two output electrodes and configured to conduct the alternating three phase or single phase current to at least one remote location.

18. The system of claim 17, wherein each of the at least two input electrodes comprises at least one helically shaped portion.

19. The system of claim 17, wherein the chamber comprises an end cap and a split electrode at opposite ends of the chamber, and wherein the split electrode conveys either three phase AC or single phase AC from the chamber.

20. The system of claim 17, wherein the at least two input electrodes comprise at least two sets of electrodes equally spaced around the chamber.

21. The system of claim 17, wherein the transformer further comprises a solenoid disposed around at least a portion of an external wall of the chamber, and wherein an electric current passing through the solenoid induces a magnetic field within the chamber in an axial direction of the solenoid.

22. The system of claim 21, wherein the induced the motion in the plasma distorts the magnetic field thereby inducing the three phase alternating current or single phase alternating current within the chamber.

* * * * *